C. J. TUSETH.
PLOW ATTACHMENT.
APPLICATION FILED APR. 8, 1915.
1,164,147. Patented Dec. 14, 1915.
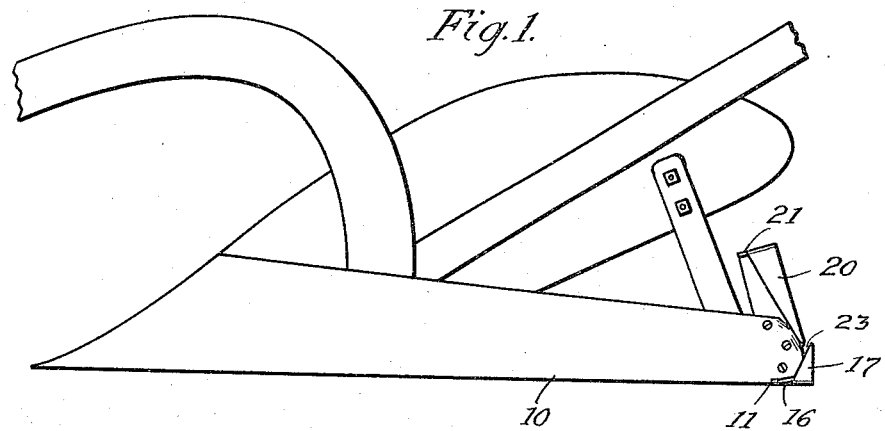
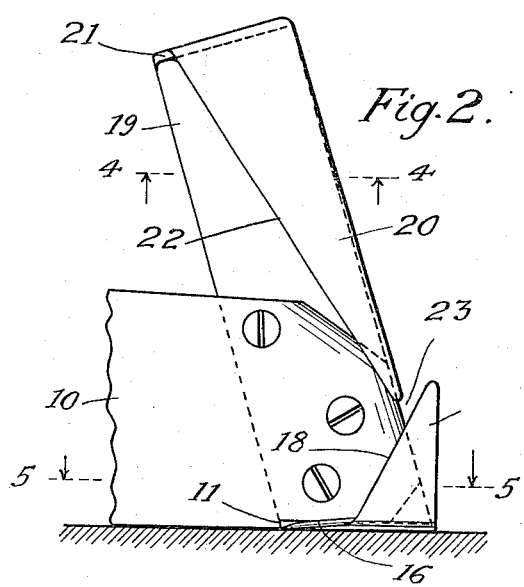
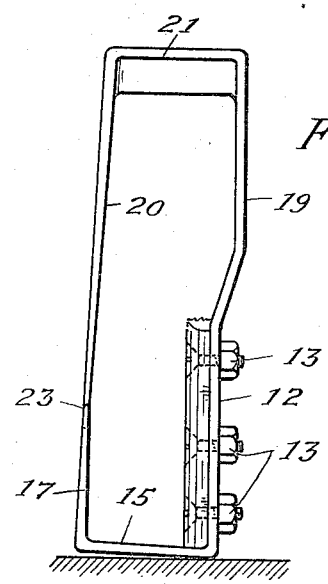
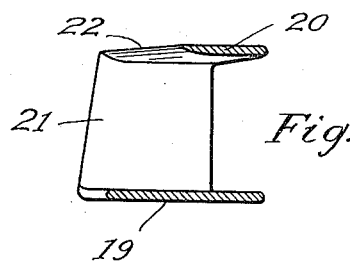
Witnesses:
Thos. Lagaard.
A. M. Royal.
Inventor:
Charles J. Tuseth.
By J. A. Whiteley
his Attorney.

UNITED STATES PATENT OFFICE.

CHARLES J. TUSETH, OF OSSEO, MINNESOTA.

PLOW ATTACHMENT.

1,164,147.  Specification of Letters Patent.  Patented Dec. 14, 1915.

Application filed April 8, 1915. Serial No. 19,898.

*To all whom it may concern:*

Be it known that I, CHARLES J. TUSETH, a citizen of the United States, residing at Osseo, in the county of Hennepin and State of Minnesota, have invented certain new and useful Improvements in Plow Attachments, of which the following is a specification.

My invention relates to attachments to plows of the general nature of that shown and described in my Patent Number 1,106,526, in which means are shown for cutting a slice from the furrow wall outside of the landside and turning the same into the furrow so that the furrow will be wider than the portion turned over and such portion will, therefore, fall flat.

It is the object of my present invention to provide a furrow slicer attachment for the landside of a plow which shall be particularly simple in construction, efficient in operation, and shall be formed preferably of a single piece of metal.

The full objects and advantages of my invention will appear in connection with the detailed description thereof, and are particularly pointed out in the claims.

In the drawings illustrating my invention, in one form, Figure 1 is an elevation view of a plow having my attachment connected therewith. Fig. 2 is an enlarged side view of the attachment. Fig. 3 is an end view of the same. Fig. 4 is a section on line 4—4 of Fig. 2. Fig. 5 is a section on line 5—5 of Fig. 2.

As illustrated, the land side 10 of the plow is cut away slightly at the extreme rear end, as indicated at 11. The attachment comprises a back plate 12 which is secured to the landside by bolts 13 countersunk, as indicated at 14 in Fig. 5, so that the outside of the landside will have a flush surface. Backplate 12 has a portion 15 which extends under the landside and within the cutout portion thereof in a direction nearly horizontal but preferably slightly inclined upwardly, as indicated in Fig. 3. The portion 15 has its front edge 16 obliquely disposed and from the end of this portion is an upstanding part 17 formed with a rearwardly oblique cutting edge 18 preferably extending inwardly a little, as indicated in Fig. 3, so that the upper edge of the knife 18 is closer to the bottom.

The back-plate 12 has the upper portion 19 offset above the landside to give throat room between said portion and an upper knife member 20 which depends from an upper cross-bar $w^1$ which is preferably integrally extended from the portion 19 of backplate 12. As clearly shown, the backplate 12 and its connected portion 19 are secured to the landside in a forwardly oblique manner. A knife member 20 has the forward edge 22 thereof sharpened and extending in an oblique manner from the cross bar 21 to the point of knife member 20 which is positioned in the plane of member 17, said point being spaced from member 17, as indicated at 23, to permit roots engaged by the attachment and which are too tough to be cut to slide beneath knife member 20 along knife edge 18 and over the end thereof.

It will thus be apparent that an exceedingly simple furrow slicer attachment to the landside of a plow is provided which, in no respect, interferes with the operation of the landside and which, at the same time, will cut from the wall of the furrow adjacent the landside a slice of earth such as to permit the furrow to turn over and fall flat. This slice will be somewhat wider at the bottom than at the top and the opening 23 between the knives 20 and 17 will permit any roots which may be engaged and which are too tough to be cut by the slicer to slide along and over the obliquely turned knife 18 and below the point of knife 22, thus insuring thoroughly efficient action.

I claim:

1. A furrow slicer comprising a backplate secured to the inside of the landside and having portions extending across the upper and lower edges of the landside and knives carried by said extended portions so as to cut a slice of the furrow wall, there being space between said knives to permit the passage of roots or other substances too tough to be cut by the knives.

2. A furrow slicer comprising a backplate secured to the inside of the landside and having portions extending across the upper and lower edges of the landside and knives carried by said extended portions so as to cut a slice of the furrow wall, there being space between said knives to permit the passage of roots or other substances too tough to be cut by the knives, the cutting edges of said knives being obliquely disposed in respect to the horizontal and to one another so that both of said cutting edges slope rearwardly toward each other.

In testimony whereof I affix my signature in presence of two witnesses.

CHARLES J. TUSETH.

Witnesses:
F. A. WHITELEY,
IRENE EMPENGER.

Copies of this patent may be obtained for five cents each, by addressing the "Commissioner of Patents. Washington, D. C."